(12) United States Patent
Tomita

(10) Patent No.: US 7,187,714 B2
(45) Date of Patent: Mar. 6, 2007

(54) IMAGE PROCESSING APPARATUS FOR SUPPRESSING HIGH-FREQUENCY COMPONENTS OF COLOR DIFFERENCE DATA

(75) Inventor: Yoshinori Tomita, Kanagawa (JP)

(73) Assignee: Sony Corporation, Tokyo (JP)

( * ) Notice: Subject to any disclaimer, the term of this patent is extended or adjusted under 35 U.S.C. 154(b) by 477 days.

(21) Appl. No.: 10/333,509

(22) PCT Filed: Apr. 30, 2002

(86) PCT No.: PCT/JP02/04308

§ 371 (c)(1),
(2), (4) Date: Sep. 29, 2003

(87) PCT Pub. No.: WO02/096092

PCT Pub. Date: Nov. 28, 2002

(65) Prior Publication Data

US 2004/0047416 A1 Mar. 11, 2004

(30) Foreign Application Priority Data

May 21, 2001 (JP) ............................. 2001-150891

(51) Int. Cl.
*H04N 7/12* (2006.01)

(52) U.S. Cl. ................................................. 375/240.18

(58) Field of Classification Search .......... 375/240.01, 375/240.18, 240.2, 240.26, 240.27; *H04N 7/12*
See application file for complete search history.

(56) References Cited

U.S. PATENT DOCUMENTS 4,920,414 A 4/1990 Remus et al.
5,719,961 A 2/1998 Normile et al.

FOREIGN PATENT DOCUMENTS

| JP | 4-311195 | 11/1992 |
| JP | 5-14739 | 1/1993 |
| JP | 6-70175 | 3/1994 |
| JP | 7-74959 | 3/1995 |
| JP | 7-322259 | 12/1995 |

*Primary Examiner*—Young Lee
(74) *Attorney, Agent, or Firm*—Frommer Lawrence & Haug LLP; William S. Frommer; Thomas F. Presson

(57) ABSTRACT

An image processing apparatus capable of reducing noise contained in input image data. By determining whether or not, among the absolute values of the AC components of luminance Y, there is at least one value greater than a threshold value A, it is determined whether the components are effective edge components of the image or noise components. When it is determined that the components are effective edge components of the image, a suppress_flag is set to "0" so that a suppression process is not performed. When it is determined that the components are noise components, the suppress_flag is set to "1" so that a suppression process is performed. The present invention can be applied to a video camera for capturing an image of a subject.

7 Claims, 4 Drawing Sheets

IMAGE PROCESSING APPARATUS FOR SUPPRESSING HIGH-FREQUENCY COMPONENTS OF COLOR DIFFERENCE DATA

TECHNICAL FIELD

The present invention relates to an image processing apparatus and, more particularly, to an image processing apparatus which is suitably used to eliminate noise components contained in image data.

BACKGROUND ART

As techniques for coding still images and moving images, the JPEG (Joint Photographic Experts Group) technique, the MPEG (Moving Picture Experts Group) technique, and so on are used. For example, in the JPEG technique, a coding process is performed in such a way that a captured still image is divided into a block of 8×8 portions, and DCT (Discrete Cosine Transform) processing and quantization processing are performed on that block.

In the above-described coding process using DCT, there are cases in which, in order to reduce noise, a process for suppressing AC (Alternating Current) coefficients of luminance and color differences is performed. In a case where noise is reduced in such a manner, a problem arises in that block distortion sometimes occurs.

DISCLOSURE OF INVENTION

The present invention has been made in view of such circumstances. An object of the present invention is to reduce noise by comparing noise components and edge components with a threshold value.

The image processing apparatus of the present invention comprises orthogonal conversion means for performing orthogonal conversion on input image data; comparison means for comparing at least one of AC components of luminance data and AC components of color-difference data of the image data on which orthogonal conversion has been performed by the orthogonal conversion means with a predetermined threshold value; and suppression means for suppressing high-frequency components of the color-difference data when it is determined by the comparison means that components which are greater than the threshold value do not exist within the AC components.

The comparison means may compare low-frequency components of the AC components of the luminance data with the threshold value.

The comparison means may compare low-frequency components of the AC components of the color-difference data with the threshold value.

The orthogonal conversion of the orthogonal conversion means may be DCT.

The image processing apparatus may comprise a video camera section including image-capturing means.

The image processing method of the present invention comprises an orthogonal conversion step of performing orthogonal conversion on input image data; a comparison step of comparing at least one of AC components of luminance data and AC components of color-difference data of the image data on which orthogonal conversion has been performed in the process of the orthogonal conversion step with a predetermined threshold value; and a suppression step of suppressing high-frequency components of the color-difference data when it is determined in the process of the comparison step that components which are greater than the threshold value do not exist within the AC components.

The program of the recording medium of the present invention comprises an orthogonal conversion step of performing orthogonal conversion on input image data; a comparison step of comparing at least one of AC components of luminance data and AC components of color-difference data of the image data on which orthogonal conversion has been performed in the process of the orthogonal conversion step with a predetermined threshold value; and a suppression step of suppressing high-frequency components of the color-difference data when it is determined in the process of the comparison step that components which are greater than the threshold value do not exist within the AC components.

The program of the present invention allows a computer to execute an orthogonal conversion step of performing orthogonal conversion on input image data; a comparison step of comparing at least one of AC components of luminance data and AC components of color-difference data of the image data on which orthogonal conversion has been performed in the process of the orthogonal conversion step with a predetermined threshold value; and a suppression step of suppressing high-frequency components of the color-difference data when it is determined in the process of the comparison step that components which are greater than the threshold value do not exist within the AC components.

In the image processing apparatus and method, and the program of the present invention, at least one of the AC components of the luminance data and the AC components of the color-difference data of the image data on which orthogonal conversion is performed are compared with a threshold value. When it is determined by the comparison result that components greater than the threshold value do not exist within the AC components, the high-frequency components of the color-difference data are suppressed.

BEST MODE FOR CARRYING OUT THE INVENTION

Figure 1:
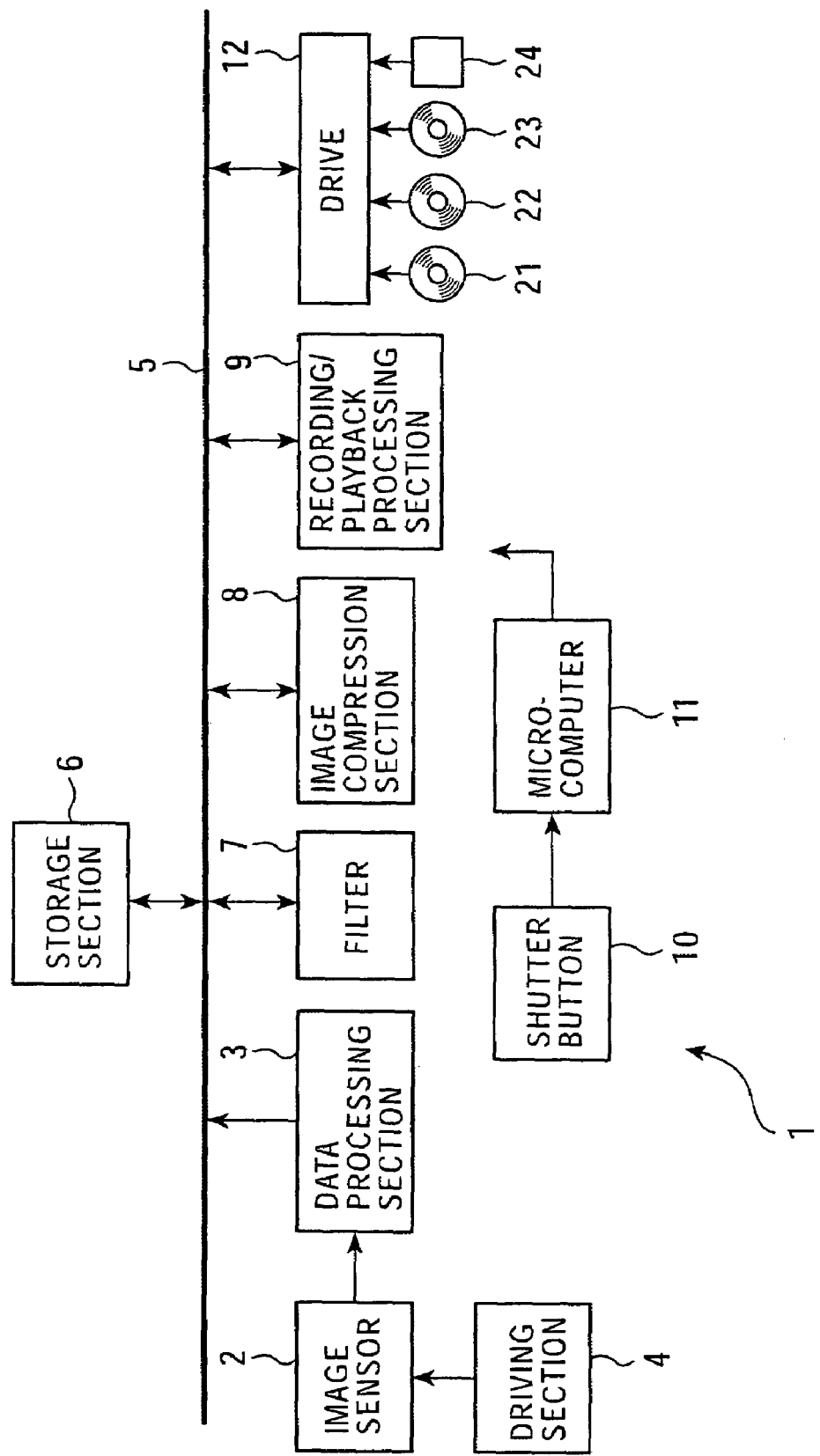
FIG. 1 shows the configuration of an embodiment of an image processing apparatus to which the present invention is applied.

An embodiment of the present invention will now be described below with reference to the drawings. FIG. 1 shows the configuration of an embodiment of an image processing apparatus to which the present invention is applied. The image processing apparatus 1 is an apparatus for handling, for example, still images and moving images for a digital still camera, a digital video camera, a camcorder, etc. Image data of an image captured by an image sensor 2 of the image processing apparatus 1 is output to a data processing section 3. The image sensor 2 is driven by a driving section 4.

The data processing section 3 generates luminance data and color-difference data from the input image data, and outputs the data to a storage section 6 via a data bus 5. The storage section 6 temporarily stores the luminance data and the color-difference data. The luminance data and the color-difference data stored in the storage section 6 are output to a filter 7. The filter 7 performs a process for conversion into a resolution of a desired image size on the input luminance data and color-difference data, and causes the data to be stored again in the storage section 6.

The luminance data and the color-difference data whose resolutions are converted, stored in the storage section 6, are output to an image compression section 8, whereby a compression process is performed. The luminance data and the color-difference data on which a coding process has been performed are recorded on a recording medium (not shown) by a recording/playback processing section 9. Such a recording process is performed when a shutter button 10 is operated, and a process corresponding to that operation is instructed from a microcomputer 11.

A drive 12 is used when data is read from or written into a recording medium, such as a magnetic disk 21, an optical disk 22, a magneto-optical disk 23, or a semiconductor memory 24.

Figure 2:
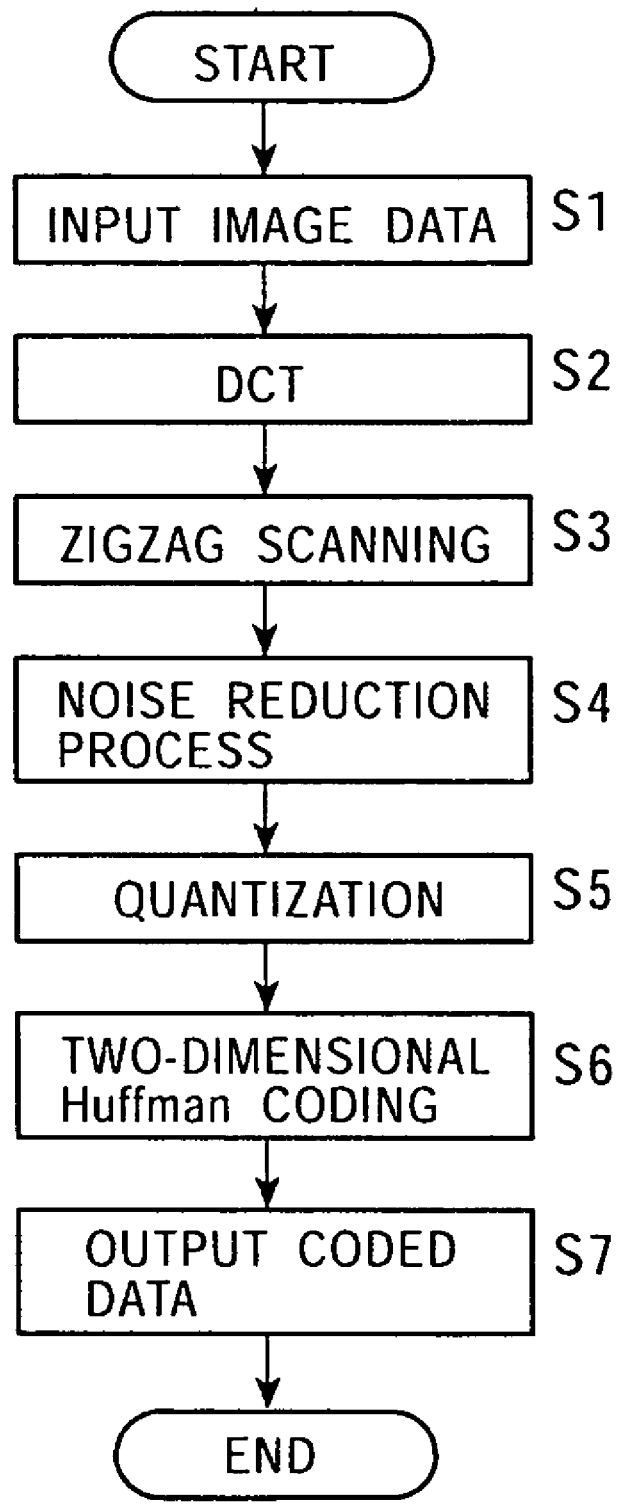
FIG. 2 is a flowchart illustrating the operation of an image compression section 8.

FIG. 2 is a flowchart illustrating processes performed in the image compression section 8. In step S1, luminance data and color-difference data serving as image data stored in the storage section 6 are input via the data bus 5. In the following description, the image data is assumed to be data sampled at a 4:2:2 color space of luminance and color differences.

In step S2, DCT (Discrete Cosine Transform) is performed. First, the image data is divided into a block of 8×8 pixels. DCT is performed on the divided block. In this case, since a 4:2:2 color space is used, DCT is performed in units of 2 blocks for the luminance and 1 block for each of the color differences Cb and Cr.

Figure 3:
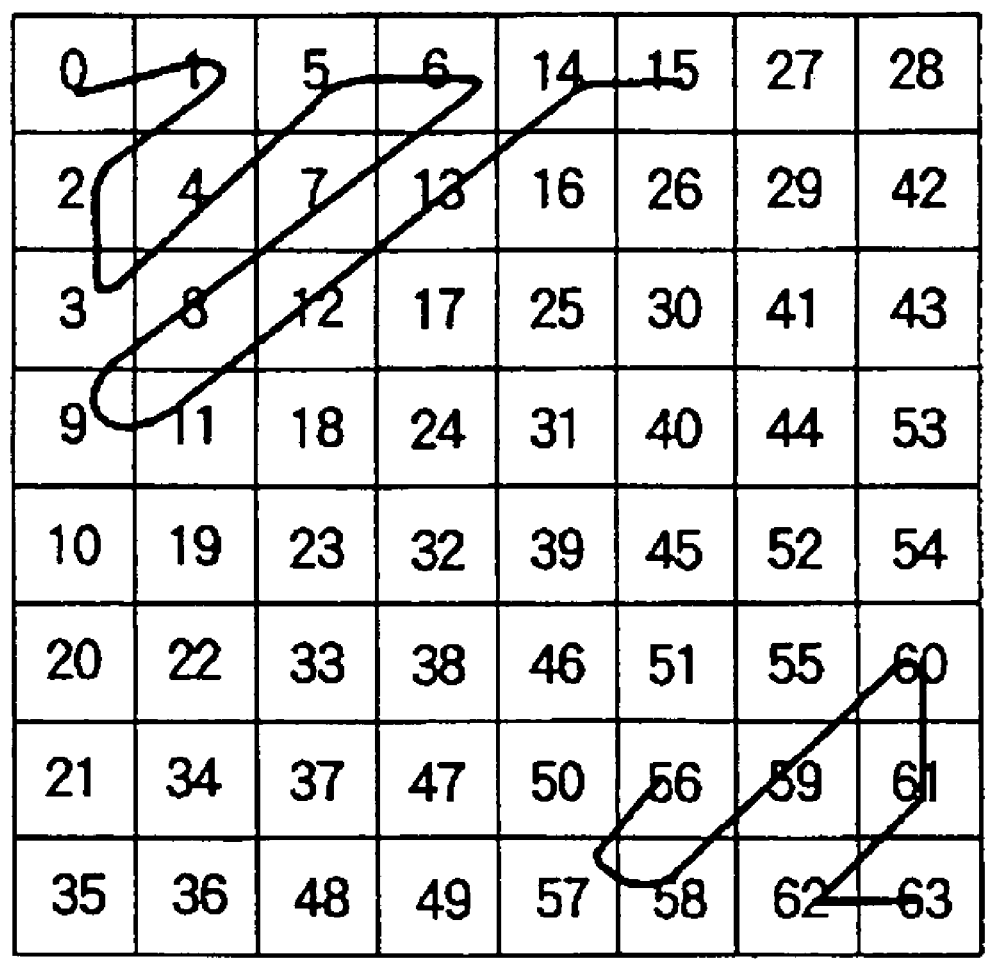
FIG. 3 illustrates zigzag scanning.

In step S3, zigzag scanning is performed on the image data of the block in units of 8×8 pixels. As shown in FIG. 3, for the block in units of 8×8 pixels, by assuming the pixel in the upper left corner to be 0, numbers (coefficients) of 1 through 63 are assigned up to the lower right corner in the order zigzag scanning is performed. Coefficient 0 indicates DC components, and coefficients 1 through 63 indicate AC components. As a result of the zigzag scanning being performed on the AC components, the image data is converted into a set of zero run lengths and data.

In step S4, a noise reduction process is performed. The noise reduction process will be described later. In step S5, quantization is performed on the image data on which the noise reduction process has been performed. The quantization is performed in such a manner that image data on which DCT has been performed is divided by a predetermined coefficient. As a result of the quantization being performed, the entropy of the image data can be lowered. Then, in step S6, two-dimensional Huffman coding is performed.

In step S7, the image data which has been coded in this manner is output to the recording/playback processing section 9, whereby the data is recorded in a recording medium (not shown).

Figure 4:
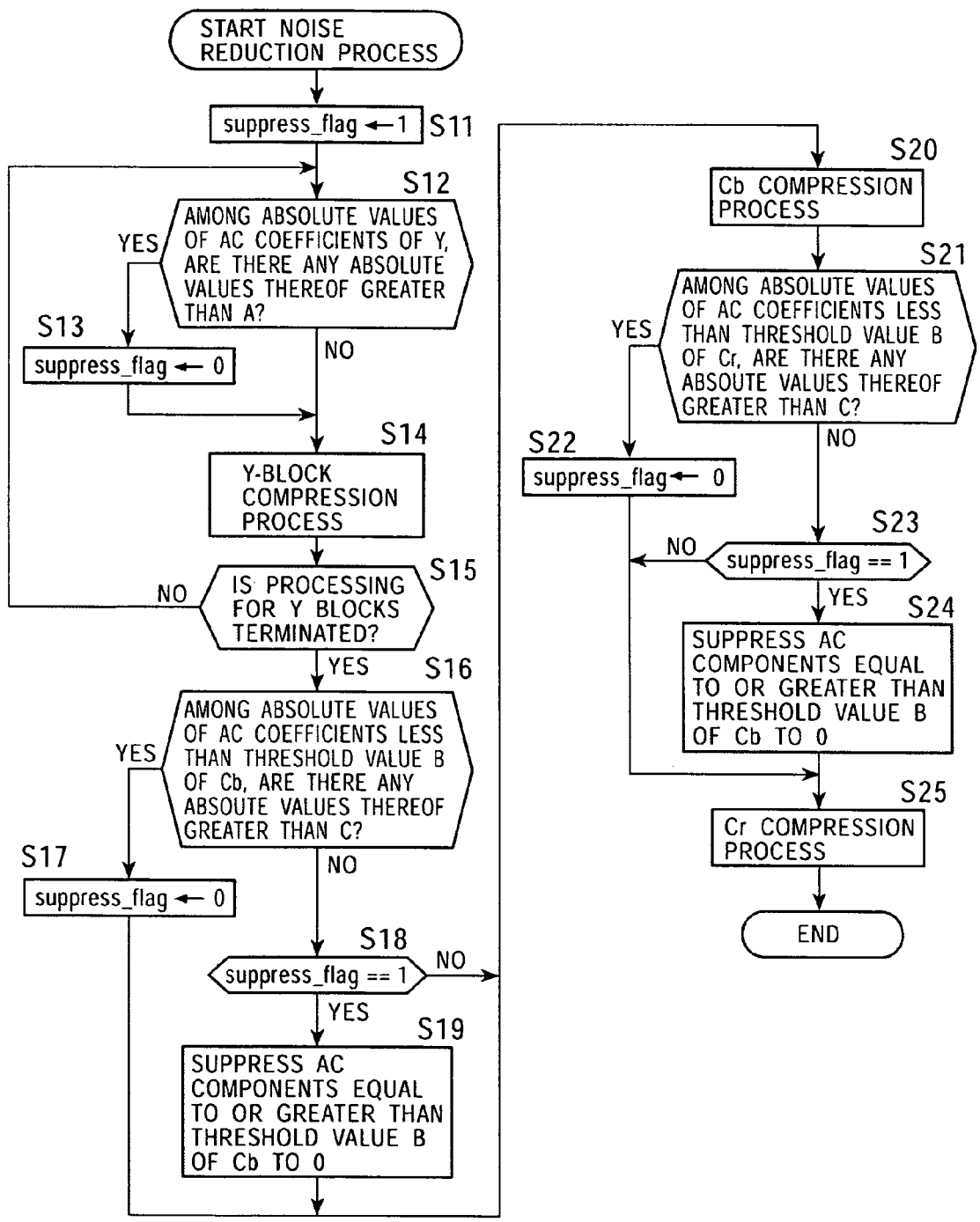
FIG. 4 is a flowchart illustrating details of a noise reduction process performed in step S4 of FIG. 2.

Referring to the flowchart in FIG. 4, a description will now be given of the noise reduction process performed in step S4 of FIG. 2. The noise reduction process with reference to the flowchart shown in FIG. 4 is performed in units of macroblocks. In this embodiment, reduction of noise is performed by suppressing the high-frequency components of the chroma of the flat portion.

In step S11, initialization is performed by setting a suppress_flag to "1". This suppress_flag is a flag indicating whether or not the high-frequency components of the chroma of the flat portion should be suppressed. When the suppress_flag has been set to "1", this means that suppression is to be performed. When the suppress_flag has been set to "0", this means that suppression is not to be performed.

In step S12, it is determined whether or not, among the absolute values of the AC coefficients of Y, there is at least one coefficient greater than the threshold value A. As described with reference to FIG. 3, for the AC components of the luminance Y, coefficients 1 through 63 exist. In step S12, all the absolute values of the respective components of the coefficients 1 through 63 of the luminance Y may be compared with the threshold value A. However, it is assumed here that the absolute values of the respective components of the coefficients 1 through 27 of the luminance Y are compared with the threshold value A.

The reason for the above is that, even if the components are of a small amplitude, when edge components of a certain image are contained in the block after DCT processing, since the possibility that a large part of components appears in certain components of the AC coefficients 1 through 27 is high, it can be considered in step S12 that, as the targets of comparison with the threshold value A, the components of the AC coefficients 1 through 27 are sufficient. Of course, the components of AC coefficients 1 through 63 may be used as the targets of comparison with the threshold value A.

As discussed above, by decreasing the number of targets of comparison with the threshold value A (by making the low-frequency components among the AC components to be targets), it becomes possible to shorten the processing time required for the noise reduction process. Also, by appropriately selecting the targets of comparison (in this case, the AC coefficients 1 through 27 are selected), it becomes possible to reliably perform a noise reduction process without causing a deterioration in the noise reduction process.

When it is determined in step S12 that, among the absolute values of the components of the AC coefficients 1 through 27 of the luminance Y, there is at least one value greater than the threshold value A, the process proceeds to step S13. When it is determined that there is no value greater than the threshold value A, the process of step S13 is skipped, and the process proceeds to step S14. In step S13, the suppress_flag is set to "0". That is, in the subsequent processes, the setting is performed so that a suppression process is performed as necessary. The suppression refers to components to be processed being set to 0 data.

When it is determined that, among the absolute values of the components of the AC coefficients 1 through 27 of the luminance Y, there is at least one value greater than the threshold value A and the suppress_flag is set to "0", it can be determined that edge components of a certain image are contained in the image of the DCT block to be processed. However, even when effective edge components of the image are not contained, noise components of a small amplitude are output from, for example, the image-capturing device of the image sensor 2 (FIG. 1), and the noise components may exert an influence on the components of the luminance Y.

By considering the above, the threshold value A is set to a value by which the components within the image of the DCT block can be identified as components formed by the effective edge components of the image or as components formed by the noise components. A threshold value C (to be described later) is also set similarly.

In step S14, a process for compressing the DCT block of the luminance Y is performed. Whether or not the process for compressing the DCT block of the luminance Y is terminated is determined in step S15.

When a macroblock of a 4:2:2 image is to be processed, there are two DCT blocks of the luminance Y, and therefore, processes of steps S12 through S15 are repeated two times. When it is determined in step S15 that the process for compressing the DCT block of the luminance Y is terminated, the process proceeds to step S16. In step S16, it is determined whether or not, among the absolute values of the components of the AC components less than the threshold value B of the color difference Cb, there is at least one component of a value greater than the threshold value C.

The threshold value B is set as a value indicating the boundary between the low-frequency components and the high-frequency components of the color difference Cb (color difference Cr). When it is determined in step S16 that, among the absolute values of the AC components of the color difference Cb less than the set threshold value B, there are components of the AC coefficient of a value greater than the threshold value C, the process proceeds to step S17. When it is determined that there are no such components, the process proceeds to step S18.

In step S17, the suppress_flag is set to "0", that is, the suppress_flag is set so that suppression is not performed in the subsequent processes. In step S18, it is determined whether or not the suppress_flag is "1". When it is determined that the suppress_flag is "1", the process proceeds to step S19. Since the suppress_flag is determined to be "1", in step S19, the components of the AC coefficient greater than the threshold value B of the color difference Cb are suppressed to "0". Then, in step S20, a compression process is performed on the DCT block of the color difference Cb.

On the other hand, when it is determined in step S18 that the suppress_flag is not "1", that is, the suppress_flag is "0", or when the suppress_flag is set to "0" in step S17, the process proceeds to step S20, where a compression process is performed on the DCT block of the color difference Cb.

When the compression process for the DCT block of the color difference Cb in step S20 is terminated, the process proceeds to step S21. The processes of steps S21 through S25 are processes for the DCT block of the color difference Cr, and basically, these processes are the same as the processes performed on the DCT block of the color difference Cb in steps S16 through S20. Accordingly, an explanation thereof is omitted.

For the threshold value B and the threshold value C, the same value may be used during the processes for the color difference Cb and the color difference Cr, and different values may also be used.

The above-described noise reduction process is performed in such a way that the AC components of the luminance Y, in particular, the AC components 1 through 27 positioned in the upper left of the DCT block, the low-frequency components of the color difference Cb (the components of the AC coefficient less than the threshold value B), and the low-frequency components of the color difference Cr (the components of the AC coefficient less than the threshold value B) are made to be detection targets (targets of comparison with the threshold value A or the threshold value C), and is performed in such a way that the high-frequency components of the color difference Cb and the high-frequency components of the color difference Cr are made to be targets of suppression. As a result, noise generated by the image sensor 2, etc., is eliminated.

As a result of the above, it is possible to prevent effective edge components of the image from being determined to be noise and from being suppressed, conversely, it is possible to prevent noise from being determined to be effective edge components of the image and from being not suppressed. Thus, it is possible to reliably leave the edge components of the image and to eliminate unwanted noise.

In the above-described embodiment, the case of image data which is sampled at a 4:2:2 color space has been described as an example. Of course, the present invention can be applied to a 4:2:0 color space and a 4:1:1 color space.

Although the above-described series of processes can be performed by hardware, the processes can also be performed by software. In a case where the series of processes is performed by software, programs which form the software are installed from a recording medium into a computer incorporated into dedicated hardware or into, for example, a general-purpose personal computer capable of executing various types of functions by installing various programs.

A recording medium may be formed of a packaged medium in which the program is recorded, which is distributed for providing the program to a user separately from a personal computer, as shown in FIG. 1, such as the magnetic disk 21 (including a floppy (registered trade name) disk), the optical disk 22 (CD-ROM (Compact Disk-Read Only Memory) and a DVD (Digital Versatile Disk)), the magneto-optical disk 23 (including MD (Mini-Disc) (registered trade name)), or the semiconductor memory 24. The recording medium may also be formed of a ROM or a hard disk in which the program is recorded, such recording medium being provided to the user while being incorporated in advance in the computer.

In this specification, the steps forming the program provided in the form of a recording medium may be executed chronologically according to the written orders. However, they do not have to be executed chronologically, and they may be executed concurrently or individually.

INDUSTRIAL APPLICABILITY

As has thus been described, according to the image processing apparatus and method, and the program of the present invention, at least one of the AC components of the luminance data and the AC components of the color-difference data of image data which has been subjected to orthogonal conversion are compared with a threshold value. When it is determined by the comparison result that components greater than the threshold value do not exist within the AC components, the high-frequency components of the color-difference data are suppressed. Therefore, it is possible to reduce noise components without causing block distortion to occur

The invention claimed is:

1. An image processing apparatus comprising:
orthogonal conversion means for performing orthogonal conversion on input image data;
comparison means for comparing AC components of luminance data and low-frequency AC components of color-difference data of said image data on which orthogonal conversion has been performed by said orthogonal conversion means with a first predetermined threshold value and a second predetermined threshold value, respectively; and
suppression means for suppressing high-frequency components of said color-difference data when it is determined by said comparison means that components greater than said first threshold value do not exist within said AC components of luminance data nor components which are greater than said second threshold value exist within said low-frequency AC components of color-difference data.

2. An image processing apparatus according to claim 1, wherein said comparison means compares low-frequency components of the AC components of said luminance data with said first threshold value.

3. An image processing apparatus according to claim 1, wherein said orthogonal conversion of said orthogonal conversion means is DCT.

4. An image processing apparatus according to claim 1, wherein said image processing apparatus comprises a video camera section including image-capturing means.

5. An image processing method comprising:
   an orthogonal conversion step of performing orthogonal conversion on input image data;
   a comparison step of comparing AC components of luminance data and low-frequency AC components of color-difference data of said image data on which orthogonal conversion has been performed in the process of said orthogonal conversion step with a first predetermined threshold value and a second predetermined threshold value, respectively; and
   a suppression step of suppressing high-frequency components of said color-difference data when it is determined in the process of said comparison step that components greater than said first threshold value do not exist within said AC components of luminance data nor components which are greater than said second threshold value exist within said low-frequency AC components of color-difference data.

6. A recording medium having recorded thereon a computer-readable program, said program comprising:
   an orthogonal conversion step of performing orthogonal conversion on input image data;
   a comparison step of comparing AC components of luminance data and low-frequency AC components of color-difference data of said image data on which orthogonal conversion has been performed in the process of said orthogonal conversion step with a first predetermined threshold value and a second predetermined threshold value, respectively; and
   a suppression step of suppressing high-frequency components of said color-difference data when it is determined in the process of said comparison step that components greater than said first threshold value do not exist within said AC components of luminance data nor components which are greater than said second threshold value exist within said low-frequency AC components of color-difference data.

7. A program stored on a computer-readable medium comprising:
   an orthogonal conversion step of performing orthogonal conversion on input image data;
   a comparison step of comparing AC components of luminance data and low-frequency AC components of color-difference data of said image data on which orthogonal conversion has been performed in the process of said orthogonal conversion step with a first predetermined threshold value and a second predetermined threshold value, respectively; and
   a suppression step of suppressing high-frequency components of said color-difference data when it is determined in the process of said comparison step that components greater than said first threshold value do not exist within said AC components of luminance data nor components which are greater than said second threshold value exist within said low-frequency AC components of color-difference data.

* * * * *